(12) United States Patent
Dixon

(10) Patent No.: US 7,614,462 B2
(45) Date of Patent: Nov. 10, 2009

(54) DRILLING FLUIDS

(75) Inventor: Jeanette Dixon, Hartlepool (GB)

(73) Assignee: Croda International PLC, Goole, East Yorkshire (GB)

( * ) Notice: Subject to any disclaimer, the term of this patent is extended or adjusted under 35 U.S.C. 154(b) by 0 days.

(21) Appl. No.: 12/068,608

(22) Filed: Feb. 8, 2008

(65) Prior Publication Data

US 2008/0202815 A1    Aug. 28, 2008

Related U.S. Application Data

(62) Division of application No. 10/851,657, filed on May 24, 2004, now Pat. No. 7,343,986.

(30) Foreign Application Priority Data

Mar. 9, 2004    (GB) ................................. 0405273.4

(51) Int. Cl.
     *E21B 21/00*      (2006.01)
     *C09K 8/04*      (2006.01)

(52) U.S. Cl. .................... 175/65; 507/136; 508/349

(58) Field of Classification Search .................. None
See application file for complete search history.

(56) References Cited

U.S. PATENT DOCUMENTS

| | | | |
|---|---|---|---|
| 3,716,486 A | 2/1973 | Perricone | |
| 4,776,966 A | 10/1988 | Baker | |
| 5,843,873 A * | 12/1998 | Butke et al. | 508/185 |
| 5,919,738 A | 7/1999 | Norfleet et al. | |
| 2003/0125215 A1 | 7/2003 | Schwartz et al. | |

FOREIGN PATENT DOCUMENTS

| | | |
|---|---|---|
| GB | 1443654 | 7/1976 |
| GB | 2283036 | 4/1995 |

OTHER PUBLICATIONS

International Search Report for PCT/GB2005/000719 dated Jul. 5, 2005.

* cited by examiner

*Primary Examiner*—Zakiya W. Bates
(74) *Attorney, Agent, or Firm*—Jones Day

(57) ABSTRACT

Drilling fluids, drilling lubricants for such drilling fluids, and methods of drilling wells, particularly oil and/or gas wells using such drilling fluids. The inclusion of lubricants affords lubrication in drilling fluids in which the lubricant compatibility and/or performance may be adversely affected by other components of the drilling fluid, particularly divalent cations such as calcium, formate salts or highly alkaline components such as alkali silicate.

8 Claims, No Drawings

DRILLING FLUIDS

CROSS REFERENCE TO RELATED APPLICATION

This application is a divisional of U.S. application Ser. No. 10/851,657, filed May 24, 2004 now U.S. Pat. No. 7,343,986, which has been allowed. This application, in its entirety, is incorporated herein by reference.

SUMMARY OF THE INVENTION

This invention relates to drilling fluids, to drilling lubricants for such drilling fluids and to methods of drilling wells, particularly oil and/or gas wells using such drilling fluids. In particular the invention relates to the inclusion of lubricants which afford lubrication in drilling fluids in which lubricant compatibility and/or performance may be adversely affected by other components of the drilling fluid, particularly divalent cations such as calcium, formate salts or highly alkaline components such as alkali silicate.

BACKGROUND

Drilling holes in the ground is often undertaken in searching for oil or other hydrocarbon sources. In such drilling it is usual to provide a drilling fluid (sometimes called a drilling mud) circulated down the hole being drilled e.g. within the drill string, around the drill bit and returning to the surface. The drilling fluid serves to cool and lubricate the bit and to carry drilling cuttings away from the bit. The hydrostatic pressure exerted by the drilling fluid is often also used to balance pressure within the rock formation through which the hole is being drilled, most notably when a pressurised fluid e.g. water, oil or gas, is contained within the rock. Commonly water, often as a brine, is the main fluid component of the drilling fluid. Particularly with aqueous drilling fluids, lubricant additives are commonly included in the fluid to improve the lubrication properties of the fluid, particularly to improve lubrication of or around the drill bit.

We have found that the inclusion of certain hydrocarbyl polyether phosphate esters in combination with polyalkylene glycols, can give aqueous drilling fluids which provide good lubricating properties in a wide range of drilling fluids, in particular where the drilling fluid has a brine phase which is sufficiently concentrated and/or includes materials which can cause incompatibility with conventional lubricants. Incompatibility can be relevant in commercially important drilling fluids, and can arise with concentrated brines, particularly saturated or near saturated brines or with the presence of materials such as calcium, particularly as calcium chloride; formate salts; and soluble silicate salts which can be used in very highly alkaline brines.

DETAILED DESCRIPTION

The invention accordingly provides a drilling fluid having an aqueous brine phase which includes at least one of:
a) dissolved calcium, usually as $Ca^{2+}$ ions, particularly at a concentration of at least 0.1 molar,
b) dissolved formate, usually as a potassium or, and particularly, caesium salt, (caesium formate), and particularly at a concentration of at least 0.5 molar;
c) dissolved silicate, usually provided as alkali metal, especially sodium, silicate, particularly at a concentration of at least 0.4 molar; or
d) brine salts at a concentration of at least 90% by weight of the concentration at saturation;

and further including at least one polyalkylene glycol and a lubricating agent which comprises at least one hydrocarbyl polyether phosphate.

The invention includes a method of drilling a well bore in which a drilling fluid is circulated down a drill string extending through a well bore, around a drill bit and returns in the space between the drill string and the wall of the well bore, in which the drilling fluid has a brine aqueous phase which includes at least one of:
a) dissolved calcium, usually as $Ca^{2+}$ ions, particularly at a concentration of at least 0.1 molar,
b) dissolved formate, usually as a potassium or, and particularly, caesium salt, (caesium formate), and particularly at a concentration of at least 0.5 molar;
c) dissolved silicate, usually provided as alkali metal, especially sodium, silicate, particularly at a concentration of at least 0.4 molar; or
d) brine salt(s) at a concentration of at least 90% by weight of the concentration at saturation;

and further including at least one polyalkylene glycol and a lubricating agent which comprises at least one hydrocarbyl polyether phosphate.

The invention particularly provides drilling fluids including such brine formulation components and accordingly the invention includes the following aspects:
i) A drilling fluid based on an aqueous brine containing calcium at a concentration of at least 0.1 molar and which includes at least one polyalkylene glycol and a lubricating agent which comprises at least one hydrocarbyl polyether phosphate.
ii) A drilling fluid based on an aqueous brine containing formate, particularly as potassium or caesium formate, at a concentration of at least 0.5 molar and which includes at least one polyalkylene glycol and a lubricating agent which comprises at least one hydrocarbyl polyether phosphate.
iii) A drilling fluid based on an aqueous brine containing soluble silicate at a concentration of at least 0.4 molar and which includes at least one polyalkylene glycol and as a lubricating agent which comprises at least one hydrocarbyl polyether phosphate.
iv) A drilling fluid based on an aqueous brine containing brine salt(s) at a concentration of at least 90% by weight of the concentration at saturation and which includes at least one polyalkylene glycol and as a lubricating agent which comprises at least one hydrocarbyl polyether phosphate.

The invention further particularly provides methods of drilling using drilling fluids including such brine formulation components and accordingly the invention includes the following aspects:
i) A method of drilling which uses a drilling fluid based on a brine containing calcium at a concentration of at least 0.1 molar and which includes at least one polyalkylene glycol and as a lubricating agent at least one hydrocarbyl polyether phosphate.
ii) A method of drilling which uses a drilling fluid based on a brine formate, particularly as potassium or caesium formate, at a concentration of at least 0.5 molar and which includes at least one polyalkylene glycol and as a lubricating agent at least one hydrocarbyl polyether phosphate.
iii) A method of drilling which uses a drilling fluid based on a brine containing soluble silicate at a concentration of at least 0.4 molar and which includes at least one polyalkylene glycol and as a lubricating agent at least one hydrocarbyl polyether phosphate.

iv) A method of drilling, particularly a drill-in method, which uses a drilling fluid based on a brine containing brine salt(s) at a concentration of at least 90% by weight of the concentration at saturation and which includes at least one polyalkylene glycol and as a lubricating agent which comprises at least one hydrocarbyl polyether phosphate The hydrocarbyl polyether phosphates used as lubricants in the present invention can be formulated as lubricant formulations for inclusion in drilling fluids as solutions in aqueous mixtures including polyalkylene glycols. Particularly valuable aqueous lubricant formulations for use in this invention are those based on alkyl polyether mono-phosphate esters and polyethylene glycols and the invention accordingly includes:

i) A lubricating agent for a drilling fluid which comprises an aqueous solution of at least one mono-(hydrocarbyl polyether) phosphate ester, particularly at a concentration of from 2 to 40 wt % of the solution, and at least one polyethylene glycol having an average molecular weight of from 100 to 4000, particularly at a concentration of from 50 to 90 wt % of the solution;

ii) A method of drilling a well bore in which a drilling fluid is circulated through a drill string extending through a well bore, around a drill bit and returns in the space between the drill string and the wall of the well bore, in which the drilling fluid has an aqueous phase which includes at least one mono-(hydrocarbyl polyether) phosphate ester, particularly at a concentration of from 2 to 40 wt % of the drilling fluid, and at least one polyethylene glycol having an average molecular weight of from 100 to 4000, particularly at a concentration of from 50 to 90 wt % of the drilling fluid.

The amount of lubricant formulation that is included in the drilling fluid is typically from 0.5 to 10%, more usually from 1 to 5 wt % of the drilling fluid. This gives corresponding typical levels of the phosphate ester and PAG of approximately 0.05 to 1 and 0.3 to 8 more usually from 0.1 to 0.5 and 0.7 to 4 all % by weight of the drilling fluid.

In this invention the term "brine" refers to an aqueous solution of one or more salts, particularly one in which the salt concentration is relatively high, in particular to provide a solution having a density substantially higher than water. Commonly higher concentrations of salts than present in normal seawater are used to achieve higher densities. In this context a saturated brine is one which, under use conditions, will not dissolve further of at least one (but, where more than one salt is used, not necessarily all) of its component salt(s) and references to percent saturation are to the relative concentration of such a salt as compared with its concentration at saturation.

The term "drilling fluid" refer to water based fluids which may (and usually will) contain dispersed solids and which are used in drilling well bores to provide cooling, lubrication, pressure balance and/or drilling cuttings removal (commonly all of these) and may additionally act as a carrier for additives having particular effects e.g. shale inhibition. In common use in the art the terms "drilling fluid" and "drilling mud" are synonymous. Very commonly drilling fluids include dispersed solids, usually either weighting solids [relatively high density finely divided solid material used to increase the density of a drilling fluid particularly to increase the hydrostatic pressure at the bottom of a well bore] or solids having other functions such as bridging materials [finely divided materials used to prevent or eliminate loss of fluid from the well bore to the formation, (lost circulation) or solids included in a drilling fluid to bridge across the pore throats or fractures of an exposed rock thereby building a filter cake to prevent loss of whole mud or excessive filtrate]. Thus, drilling fluids used in drilling the main, typically mainly vertical, bore usually include dispersed solid weighting materials and are referred to as "weighted drilling fluids".

Weighting materials are typically relatively dense solids that are insoluble in the drilling fluid continuous phase and are used to increase the density of a drilling fluid. Examples include e.g. barites, $BaSO_4$ with a specific gravity (SG) typically 4.2 or higher; and iron oxide, particularly haematite, SG typically at least 5; are commonly used, but galena (PbS), SG typically about 7.5; calcium carbonate, SG typically 2.7 to 2.8; siderite, ferrous carbonate—SG typically about 3.8; and ilmenite, mixed iron oxide titanium dioxide, SG typically about 4.6; have also been used. In this context SG is numerically substantially the same as density measure in $g \cdot cm^{-3}$. When used the amount of weighting agent used in a drilling fluid is typically in the range 1 to 75%, more usually 2 to 50%, particularly 5 to 30%, more particularly 10 to 20%, by weight of drilling fluid.

The invention accordingly provides a weighted drilling fluid having an aqueous brine phase which includes at least one of:

a) dissolved calcium, usually as $Ca^{2+}$ ions, particularly at a concentration of at least 0.1 molar, b) dissolved formate, usually as a potassium or, and particularly, caesium salt, (caesium formate), and particularly at a concentration of at least 0.5 molar;

c) dissolved silicate, usually provided as alkali metal, especially sodium, silicate, particularly at a concentration of at least 0.4 molar; or d) brine salts at a concentration of at least 90% by weight of the concentration at saturation;

and further including at least one polyalkylene glycol and a lubricating agent which comprises at least one hydrocarbyl polyether phosphate, and finely divided solid bridging material.

The invention includes a method of drilling a well bore down, usually substantially vertically, to a target, particularly a production, formation in which a weighted drilling fluid is circulated down a drill string extending down a well bore, around a drill bit and upwardly in the space between the drill string and the wall of the well bore, in which the drilling fluid has a brine aqueous phase which includes at least one of:

a) dissolved calcium, usually as $Ca^{2+}$ ions, particularly at a concentration of at least 0.1 molar, b) dissolved formate, usually as a potassium or, and particularly, caesium salt, (caesium formate), and particularly at a concentration of at least 0.5 molar;

c) dissolved silicate, usually provided as alkali metal, especially sodium, silicate, particularly at a concentration of at least 0.4 molar; or d) brine salts at a concentration of at least 90% by weight of the concentration at saturation;

and further including at least one polyalkylene glycol and a lubricating agent which comprises at least one hydrocarbyl polyether phosphate, and finely divided solid weighting material.

A somewhat different type of drilling fluid is a "drill-in" fluid, which is a fluid used when drilling through the reservoir section of a well bore e.g. from the bottom of a primary well in a reservoir to provide access to more remote parts of the reservoir. Frequently such well bores are typically mainly horizontal. Drill-in fluids usually include dispersed bridging materials i.e. solids that can block the pores in the reservoir rock to prevent flow of oil or gas into the well bore along its length, particularly during drilling. Commonly it is desirable to be able to remove the bridging material after drilling e.g. to enable production from along the a length of the well bore, and with this in mind bridging materials are commonly water soluble salts e.g. sodium chloride, used in drilling with saturated brine based drilling fluids, or calcium carbonate. Such bridging materials can subsequently be removed using water or acid respectively. Typically the amount of bridging agent in a drill-in fluid is from 0.1 to 30%, particularly 1 to 5%, by weight of the drilling fluid.

The invention accordingly provides a drill-in fluid having an aqueous brine phase which includes at least one of:
a) dissolved calcium, usually as $Ca^{2+}$ ions, particularly at a concentration of at least 0.1 molar,
b) dissolved formate, usually as a potassium or, and particularly, caesium salt, (caesium formate), and particularly at a concentration of at least 0.5 molar;
c) dissolved silicate, usually provided as alkali metal, especially sodium, silicate, particularly at a concentration of at least 0.4 molar; or
d) brine salt(s) at a concentration of at least 90% by weight of the concentration at saturation;

and further including at least one polyalkylene glycol and a lubricating agent which comprises at least one hydrocarbyl polyether phosphate, and finely divided solid weighting material.

The invention includes a method of drilling-in a well bore in a production formation, particularly substantially horizontally in which a drilling fluid in the form of a drill-in fluid is circulated through a drill string extending along the well bore, around a drill bit and returns in the space between the drill string and the wall of the well bore, in which the drill-in fluid has a brine aqueous phase which includes at least one of:
a) dissolved calcium, usually as $Ca^{2+}$ ions, particularly at a concentration of at least 0.1 molar,
b) dissolved formate, usually as a potassium or, and particularly, caesium salt, (caesium formate), and particularly at a concentration of at least 0.5 molar;
c) dissolved silicate, usually provided as alkali metal, especially sodium, silicate, particularly at a concentration of at least 0.4 molar; or
d) brine salt(s) at a concentration of at least 90% by weight of the concentration at saturation;

and further including at least one polyalkylene glycol and a lubricating agent which comprises at least one hydrocarbyl polyether phosphate, and finely divided solid bridging material.

For drilling-in fluids and methods, type a) and d) brines are more commonly used than the b) and c) type brines.

The hydrocarbyl polyether phosphates used as lubricants in the products and methods of this invention are desirably of the formula (I):

$$R^1O.(AO)_n.P(O)(OH)_2 \qquad (I)$$

where $R^1$ is a $C_6$ to $C_{30}$ straight or branched chain alkyl, alkenyl or alkadienyl group;

AO is an alkyleneoxy group;

n is from 2 to 100.

Within the ranges for the substituents of the compounds of the formula (I) above $R^1$, is desirably a $C_8$ to $C_{22}$, particularly a $C_8$ to $C_{20}$, more particularly $C_8$ to $C_{18}$, especially a $C_{12}$ to $C_{18}$ straight or branched chain alkyl, alkenyl or alkadienyl group.

Desirably all the alkyleneoxy groups, AO, are ethyleneoxy ($—C_2H_4O—$) groups, though mixtures of ethyleneoxy and propyleneoxy ($—C_3H_6O—$) groups, desirably having a molar ratio of ethyleneoxy groups to propyleneoxy groups of from 3:1 to 20:1 (lower proportions of propyleneoxy groups give PAGs which are not readily distinguishable from PEG homopolymers), more usually at least 5:1 and desirably at least 10:1, may be used. When the alkyleneoxy groups are mixed ethyleneoxy and propyleneoxy groups, the polyalkyleneoxy chain can be a random or block copolymeric chain. Within the range 2 to 100, n is desirably at least 3, more desirably from 4 to 50, particularly 5 to 20. Generally the value of n will be chosen to be larger where the number of carbon atoms in the group $R^1$ is larger within the ranges set out above. The number of units in the polyoxyalkylene chain, 'n', is itself an average value and may be non-integral.

In use in drilling well bores, the drilling fluid may well be alkali, often having a pH above 9, commonly above 10 and sometimes above 11. Under such conditions, it is likely that the phosphate mono-esters used in the invention will be present at least in part as salts of base species also present in the drilling fluid. Such salt forming species can include alkali metals such as sodium, potassium and caesium, and alkali earth metals such as calcium.

The hydrocarbyl polyether phosphate esters used in the invention are desirable mono-hydrocarbyl polyether esters. Generally such esters are available as mixtures of mono- and di-esters and in the invention the proportion of mono-ester will usually be at least 50 mole %, desirably at least 60 mole %, and may be above 70 mole % of the phosphate ester. Typical synthetic routes to such esters, involve reacting a precursor hydrocarbyl polyether (usually an alkyl, alkenyl or alkadienyl polyalkoxylate, usually a polyethoxylate) with a phosphating agent such as phosphorus pentoxide or polyphosphoric acid. The use of polyphosphoric acid in the synthesis can give higher proportions of mono-ester than are typically obtained with phosphorus pentoxide and products made using polyphosphoric acid may, thus, be preferred for use in this invention.

The polyalkylene glycol (PAG) is desirably a polyethylene glycol (PEG) as PEGs generally give better compatibility of the phosphate ester in the lubricant formulation and give lubricants with greater fluidity (lower viscosity). PAGs having minor proportions of other alkylene glycol residues, particularly propylene glycol residues, may be used but in this case the proportion of other alkylene glycol residues, particularly propylene glycol residues is desirably not more than about 10 mole %, particularly not more than about 5 mole %. The PAGs, particularly PEGs, used in the invention typically have a number average molecular weight of at least 100 and desirably not more than about 4000, with optimum performance in terms of providing compatibility in the drilling fluid, especially in brines, in the range of 200 to 1000 e.g. about 400.

The proportions of the major components of the lubricant formulations of and used in this invention are typically as follows:

|  | Amount (% w/w) | |
| --- | --- | --- |
| Material | Broad | More usually |
| polyalkylene glycol, particularly PEG | 50 to 90 | 60 to 80 |
| hydrocarbyl polyether phosphate ester | 2 to 40 | 5 to 20 |
| Water to 100% but usually: | 5 to 50 | 10 to 30 |

As is noted above, the aqueous phase of the drilling fluids will usually be brines in which the salts used to form the brine are typically electrolytes. Commonly lubricants are not compatible with some or all brines containing relatively high concentrations of electrolyte, in particular brines containing one or more of:
a) dissolved calcium, usually as $Ca^{2+}$ ions, particularly at a concentration of at least 0.1 molar,
b) dissolved formate, usually as a potassium or, and particularly, caesium salt, (caesium formate), and particularly at a concentration of at least 0.5 molar;
c) dissolved silicate, usually provided as alkali metal, especially sodium, silicate, particularly at a concentration of at least 0.4 molar; or
d) brine salts at a concentration of at least 90% by weight of the concentration at saturation.

The salts will commonly be inorganic, such as alkali metal, particularly sodium, potassium or caesium, or alkali earth metal particularly calcium or magnesium, or occasionally heavy metals such as zinc, halides, particularly chlorides or bromides, and occasionally nitrates; or water soluble, particularly alkali metal e.g. sodium or potassium, silicates or metasilicates. Sodium chloride is very commonly used, and frequently, particularly in marine environments, the drilling fluid may be based on seawater, which includes other salts as well as sodium chloride although at relatively low concentrations. Other salts, particularly salts of organic acids such as formic acid, may be used, for example sodium, potassium and caesium formates. The brine will often include a mixture of salts as mixtures may enable higher concentration and thus aqueous phase densities to be achieved. Most of these brines are naturally relatively near to neutral, though alkali metal earth halides will tend to be moderately acidic and alkali metal, particularly sodium or potassium, formates tend to be moderately alkaline. Silicate brines are unusual among brines in that the brine is naturally relatively alkaline, generally having a pH>10, more usually about 12. Indeed a major utility of silicate brines is that then can react to precipitate silica or insoluble silicate in pores or cracks in the well bore wall, e.g. in shale so they inherently act as shale inhibitors.

Generally the concentration of salt(s) in the brine will depending on the density desired for the brine. Typically, the concentration will be from 0.1 to 30%, particularly 0.1 to 10%, by weight of the drilling fluid. For particular salts, concentrations in the brines will more usually be in the following ranges:

| Brine Salt | Concentration Broad (% w/w) | Broad molar | More usually (% w/w) | More usually molar | Notes |
|---|---|---|---|---|---|
| sodium chloride | 1 to 35 | 0.2 to 6 | 2 to 6 | 0.4 to 6 | up to satn ca 6.1 M |
| calcium chloride | 1 to 20 | 0.1 to 6.5 | 0.1 to 20 | 0.5 to 6.5 | up to satn ca 6.5 M |
| potassium chloride | 0.1 to 30 | 0.1 to 4 | 0.1 to 10 | 0.1 to 1.5 | up to satn ca 4.7 M |
| caesium formate | 9 to 82* | 0.5 to 11 | 17 to 82 | 1 to 11 | up to satn |
| potassium formate | 4 to 45 | 0.5 to 9 | 8 to 40 | 1 to 8 | up to satn ca 9 M |
| sodium silicate | 0.5 to 40 | 0.4 to 2 | 2 to 20 | 0.5 to 1 | |

*caesium formate is typically supplied as an 82 wt % solution

Other materials that may be included in the drilling fluid include:

Fluid loss control agents act to reduce the tendency of the drilling fluid to penetrate rocks through which the well is being drilled thus losing drilling fluid and potentially damaging the rock e.g. by potentially blocking a production zone and examples include polymers such as cellulose polymers, particularly modified e.g. esterified or etherified cellulose. When used, fluid loss control agents are typically included at levels of 0.1 to 10 wt % based on the drilling fluid.

Shale inhibitors are typically alcohol alkoxylates such as $C_3$ to $C_6$ alcohol ethoxylates, propoxylates or mixed ethoxylate/propoxylates e.g. butanol mixed ethoxylate/propoxylates, or ethylene oxide/propylene oxide block copolymers, and, when used, are typically included at levels of 0.1 to 10 wt % based on the drilling fluid.

Rheology modifiers or viscosifiers are typically polysaccharides or modified polysaccharides such as Xanthan gum, starch, polyanionic cellulose and, when used, are typically included at levels of 0.1 to 0.5 wt % (100 to 500 ppm) based on the drilling fluid.

Gas hydrate inhibitors can be either thermodynamic inhibitors (melting point depressants) such as glycols such as monoethylene glycol or diethylene glycol, used at levels of from 1 to 20 wt % based on the drilling fluid; or kinetic inhibitors, particularly crystallisation inhibitors or crystal growth inhibitors, such as polyvinyl pyrolidone, or quaternary ammonium salts, typically used at levels of from 0.1 to 10, more usually 0.2 to 2, wt % based on the drilling fluid.

Dispersants may be included to aid dispersion of solid components of or solids held in the drilling fluid. Solid components of the drilling fluid include weighting solids cuttings. When used, dispersants are typically included at levels of 0.1 to 5 wt % based on the drilling fluid.

The overall composition of typically drilling fluid which may be used in the invention is summarized in the table below:

| Material | amount (% w/w) |
|---|---|
| brine salts | 0.1 to 30 |
| dispersed solids (when present) | |
| weighting material | 1 to 75 |
| bridging material | 1 to 30 |
| fluid loss control agents (when present) | 0.1 to 10 |
| shale inhibitors (when present) | 0.1 to 10 |
| rheology modifiers (when present) | 0.1 to 0.5 |

-continued

| Material | amount (% w/w) |
|---|---|
| gas hydrate inhibitors (when present) | |
| thermodynamic | 1 to 20 |
| kinetic | 0.1 to 10 |

-continued

| Material | amount (% w/w) |
|---|---|
| dispersant | 0.1 to 5 |
| lubricant | |
| hydrocarbyl polyether phosphate ester | 0.05 to 1 |
| polyalkylene glycol | 0.5 to 10 |
| water | to 100% |

In use, re-circulated drilling fluids will tend to accumulate more finely divided part of the drilling cuttings—the coarser materials will generally be removed e.g. by screening before re-circulation. In this sense, drilling cuttings may be regarded as a component of drilling fluids and will typically be present at levels of up to 20, more usually up to 10, wt % based on the drilling fluid.

The following Examples illustrate the invention. All parts and percentages are by weight unless otherwise stated.

Materials

| | |
|---|---|
| PE1 | Oleyl alcohol 6EO phosphate ester; ca 80%* mono-ester |
| PE2 | C8/C10 alcohol 4.5 EO phosphate ester; ca 60% mono-ester |
| PE3 | Decyl 4 EO phosphate ester; ca 90%* mono-ester |
| PE4 | Decyl 4 EO phosphate ester; ca 90%* mono-ester |
| | Comparative phosphate ester lubricant: |
| CPE1 | 2-ethylhexyl phosphate ester; ca 50%* mono-ester |
| PAG1 | PEG 400 - polyethylene glycol number average MW 400 |
| Clay | HMP (Hymod Prima Clay) clay used to simulate drilling cuttings |

*The % mono-ester figures for the phosphate esters are wt % based on the ester content of the material used.

Test Method(s)

Drilling Lubricity—was measured using a journal pin and vee-jaw "Falex" tester. The test was run with the pin and jaws immersed in the fluid under test at an initial test load of 250 lbf (ca 1.1 kN) and held at this force for 15 minutes after which the applied force was increased until pin failure. The load at failure (in lbf) was noted and the coefficient of friction calculated.

Compatibility testing of phosphate esters; the following brines were used:

| | |
|---|---|
| Br1 | 3% NaCl |
| Br2 | 3% NaCl + 0.05% CaCl2 |
| Br3 | 3% NaCl + 20% CaCl2 |
| Br4 | Saturated NaCl |
| Br5 | 3% NaCl + Na silicate |

Alkali was added to brines Br1 to Br4 to adjust the pH to about 11 and to Br5 to adjust the pH to about 12.5. These test brines simulate various types of drilling fluid: Br1 a brine having an electrolyte strength similar to seawater; Br2 similar but with the addition of Ca at a level somewhat higher that using hard water or dissolution of Ca from carbonaceous rocks; Br3 a mixed sodium chloride-calcium chloride (moderately concentrated) brine; Br4 a saturated sodium chloride brine; and Br5 a silicate brine.

The lubricant formulation was added to the brine at 5% by weight of the brine and mixed into the brine. The mixture was allowed to stand for 30 mins and the compatibility was assessed and reported using a numerical ranking scale as follows:

| ranking | description |
|---|---|
| 5 | clear liquid |
| 4 | slightly cloudy liquid |
| 3 | cloudy liquid |
| 2 | cloudy liquid showing some cheesing of lubricant |
| 1 | substantial lubricant precipitation |
| 0 | lubricant substantially completely insoluble in brine |

EXAMPLE 1

An experimental drilling fluid lubricant formulation Lub1 was made up as follows:

| Material | wt % |
|---|---|
| PE1 | 10 |
| PAG1 | 75 |
| Water | 15 |

The compatibility of Lub1 was assessed the results are set our in Table 1a below:

TABLE 1a

| Phosphate ester | PAG | Brine | | | | |
|---|---|---|---|---|---|---|
| | | Br1 | Br2 | Br3 | Br4 | Br5 |
| PE1 | PAG1 | 5 | 5 | 5 | 5 | 5 |

The lubrication performance of Lub1 at various addition levels from 0 to 5% by weight was assessed for load to fail and coefficient of friction (CoF) in four drilling fluids (muds) using a Falex tester and the results are set out in Table 1b below.

The Muds Used Were:

| Material | wt % |
|---|---|
| Mud A - a high solids freshwater drilling fluid | |
| sodium carbonate | 0.05 |
| potassium chloride | 5 |
| polymeric fluid loss control additive | 0.2 |
| starch | 0.8 |
| Xanthan | 0.3 |
| barite | 30.1 |
| clay | 4 |
| water | to 100% |
| Mud B - a drill-in drilling fluid | |
| Calcium carbonate | 2 |
| calcium chloride | 14 |
| polymeric fluid loss control additive | 1 |
| water | to 100% |
| Mud C - potassium formate drilling fluid | |
| calcium carbonate (solid) | 9.2 |
| barites | 8.3 |
| calcium chloride | 1.7 |
| sodium chloride | 4.2 |
| potassium formate | 12.5 |
| polymeric fluid loss control additive | 1.7 |

-continued

| Material | wt % |
|---|---|
| Xanthan | 0.4 |
| water | to 100% |
| Mud D - High calcium drilling fluid | |
| calcium carbonate (solid) | 25 |
| calcium chloride | 25 |
| sodium chloride | 120 |
| polymeric fluid loss control additive | 10 |
| clay | 15 |
| water | to 100% |

TABLE 1b

| | | | Falex results | |
|---|---|---|---|---|
| | | wt % | Load to fail | |
| Ex No | Mud | Lub1 | (lbf) | (N) | CoF |
| 1.1a | Mud A | 0 | 840 | 3.7 | 0.22 |
| 1.1b | | 1 | 2600 | 11.6 | 0.18 |
| 1.1c | | 3 | >3000 | >13.3 | 0.16 |
| 1.1d | | 5 | >3000 | >13.3 | 0.12 |
| 1.2a | Mud B | 0 | — | — | 0.15 |
| 1.2b | | 1 | — | — | 0.15 |
| 1.2c | | 3 | — | — | 0.13 |
| 1.2d | | 5 | — | — | 0.12 |
| 1.3a | Mud C | 0 | 740 | 3.3 | 0.20 |
| 1.3b | | 1 | 1200 | 5.3 | 0.18 |
| 1.3c | | 3 | 1250 | 5.6 | 0.16 |
| 1.3d | | 5 | >3000 | >13.3 | 0.15 |
| 1.4a | Mud D | 0 | 900 | 4 | 0.19 |
| 1.4b | | 1 | 2800 | 12.5 | 0.18 |
| 1.4c | | 3 | >3000 | >13.3 | 0.15 |
| 1.4d | | 5 | >3000 | >13.3 | 0.15 |

EXAMPLE 2

Different phosphate esters and PAGs were tried by substitution in the following formulations.

| | Composition of formulations | | | | |
|---|---|---|---|---|---|
| Formulation | Phosphate ester | | PAG | | |
| type | type | % | type | % | Water % |
| FG1 | various | 10 | PAG1 | 75 | 15 |
| FG2 | various | 5 | PAG1 | 80 | 15 |

The results of compatibility testing are set out in Tables 2.i to 2.ii below:

TABLE 2.i

| | | | Formulations FG1 | | | | |
|---|---|---|---|---|---|---|---|
| Form | Phos. | | Brine Compatibility | | | | |
| No | ester | PAG | Br1 | Br2 | Br3 | Br4 | Br5 |
| DrFl 1 | PE1 | PAG1 | 5 | 5 | 5 | 5 | 5 |
| DrFl 2 | PE2 | PAG1 | 5 | 3 | 3 | 5 | 5 |
| DrFl 3 | PE3 | PAG1 | 5 | 3 | 3 | 5 | 5 |

TABLE 2.i-continued

| | | | Formulations FG1 | | | | |
|---|---|---|---|---|---|---|---|
| Form | Phos. | | Brine Compatibility | | | | |
| No | ester | PAG | Br1 | Br2 | Br3 | Br4 | Br5 |
| DrFl C1 | CPE1 | PAG1 | 3 | 3 | 2 | 3 | 3 |

TABLE 2.ii

| | | | Formulations FG2 | | | | |
|---|---|---|---|---|---|---|---|
| Form | Phos. | | Brine Compatibility | | | | |
| No | ester | PAG | Br1 | Br2 | Br3 | Br4 | Br5 |
| DrFl 7 | PE1 | PAG1 | 5 | 5 | 5 | 5 | 5 |
| DrFl 8 | PE2 | PAG1 | 5 | 3 | 3 | 5 | 5 |
| DrFl 9 | PE3 | PAG1 | 5 | 3 | 3 | 5 | 5 |
| DrFl 10 | PE4 | PAG1 | 5 | 3 | 3 | 5 | 5 |
| DrFl C3 | CPE1 | PAG1 | 3 | 3 | 2 | 3 | 3 |

The invention claimed is:

1. A lubricating agent for a drilling fluid which comprises an aqueous solution of at least one mono-(hydrocarbyl polyether) phosphate ester at a concentration of from 0.05 to 1 wt % of the solution, and at least one polyethylene glycol having an average molecular weight of from 100 to 4000 at a concentration of from 0.5 to 10 wt % of the solution.

2. The lubricating agent of claim 1 wherein the hydrocarbyl polyether phosphate is or includes a compound of the formula (I):

$$R^1O.(AO)_n.P(O)(OH)_2 \quad (1)$$

where
$R^1$ is a $C_6$ to $C_{30}$ straight or branched chain alkyl, alkenyl or alkadienyl group;
AO is an alkyleneoxy group; and
n is from 2 to 100.

3. The lubricating agent of claim 2, wherein the group $R^1$ is a $C_8$ to $C_{22}$ straight or branched chain alkyl, alkenyl or alkadienyl group.

4. The lubricating agent of claim 2, wherein all the alkyleneoxy groups, AO, are ethyleneoxy ($—C_2H_4O—$) groups.

5. The lubricating agent of claim 2, wherein the alkyleneoxy groups, AO, are a mixture of ethyleneoxy and propyleneoxy ($—C_3H_6O—$) groups having a molar ratio of ethyleneoxy groups to propyleneoxy groups of from 3:1 to 20:1.

6. The lubricating agent of claim 2, wherein n is at least 3.

7. The lubricating agent of claim 1 wherein the concentration of the mono-(hydrocarbyl polyether) phosphate ester(s) is from 2 to 40 wt %, the concentration of the polyethylene glycol is from 50 to 90 wt %, and the concentration of water is from 5 to 50 wt %, all based on the total weight of the solution.

8. A method of drilling a well bore in which a drilling fluid is circulated through a drill string extending through a well bore, around a drill bit and returns in the space between the drill string and the wall of the well bore, in which the drilling fluid has an aqueous phase which includes a lubricating agent of claim 1.

* * * * *